(12) United States Patent
Moon et al.

(10) Patent No.: US 11,592,185 B2
(45) Date of Patent: Feb. 28, 2023

(54) COOKING APPARATUS AND CONTROL METHOD THEREOF

(71) Applicant: SAMSUNG ELECTRONICS CO., LTD., Suwon-si (KR)

(72) Inventors: Seong Cheol Moon, Anyang-si (KR); Tetsuji Kitashima, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 205 days.

(21) Appl. No.: 17/047,605

(22) PCT Filed: Sep. 13, 2018

(86) PCT No.: PCT/KR2018/010726
§ 371 (c)(1),
(2) Date: Oct. 14, 2020

(87) PCT Pub. No.: WO2019/203402
PCT Pub. Date: Oct. 24, 2019

(65) Prior Publication Data
US 2021/0116131 A1    Apr. 22, 2021

(30) Foreign Application Priority Data

Apr. 18, 2018  (KR) .................. 10-2018-0045086

(51) Int. Cl.
*F24C 3/12*    (2006.01)
*F23N 1/00*    (2006.01)
*F24C 3/10*    (2006.01)

(52) U.S. Cl.
CPC ............. *F24C 3/124* (2013.01); *F23N 1/005* (2013.01); *F23N 1/007* (2013.01); *F24C 3/10* (2013.01);
(Continued)

(58) Field of Classification Search
CPC . F23N 1/00; F23N 1/002; F23N 1/005; F23N 2237/20; F23N 2235/18;
(Continued)

(56) References Cited

U.S. PATENT DOCUMENTS

| | | | | |
|---|---|---|---|---|
| 4,425,930 A | * | 1/1984 | Kruto | ................ G05D 23/1912 432/12 |
| 5,096,116 A | * | 3/1992 | Akamatu | ................ A47J 27/62 126/39 G |

(Continued)

FOREIGN PATENT DOCUMENTS

| | | |
|---|---|---|
| CN | 1710338 A | 12/2005 |
| CN | 101243288 A | 8/2008 |

(Continued)

OTHER PUBLICATIONS

Korean Office Action dated Feb. 22, 2022 in Korean Patent Application No. 10-2018-0045086.
(Continued)

*Primary Examiner* — Avinash A Savani
*Assistant Examiner* — Deepak A Deean
(74) *Attorney, Agent, or Firm* — Staas & Halsey LLP

(57) ABSTRACT

The present disclosure relates to a cooking apparatus including a heating device, a gas passage to guide gas supplied from the outside to the heating device, a gas valve configured to supply gas to the gas passage, a modulating valve configured to adjust the degree of opening of the gas passage, a boosting passage formed to be branched from a first portion of the gas passage and joined to a second portion of the gas passage positioned in the rear of the first portion along a direction in which gas in the gas passage flows, a boosting valve configured to open and close the boosting passage, a first nozzle disposed between the first portion and the second portion of the gas passage, and a second nozzle (Continued)

disposed between the second portion of the gas passage and the heating device.

13 Claims, 5 Drawing Sheets

(52) U.S. Cl.
CPC .... *F24C 3/126* (2013.01); *F23K 2900/05002* (2013.01); *F23N 2235/18* (2020.01)

(58) Field of Classification Search
CPC ........ F23N 5/20; F23N 1/007; F23N 2235/16; F23N 5/203; F23N 2223/22; F23N 5/245; F24C 3/12; F23K 2900/05002
USPC ..................................... 431/36; 126/39 R, 42
See application file for complete search history.

(56) References Cited

U.S. PATENT DOCUMENTS

| | | | |
|---|---|---|---|
| 5,575,638 A * | 11/1996 | Witham | F24C 3/126 431/73 |
| 6,087,944 A | 7/2000 | Santacatterina et al. | |
| 2008/0021681 A1 | 9/2008 | Clauss et al. | |
| 2008/0216810 A1 * | 9/2008 | Clauss | F24C 3/126 126/39 R |
| 2019/0309953 A1 * | 10/2019 | Cadima | F24C 3/126 |

FOREIGN PATENT DOCUMENTS

| | | | | |
|---|---|---|---|---|
| CN | 102425813 A | 4/2012 | | |
| CN | 104515156 | 4/2015 | | |
| EP | 0818655 | 1/1998 | | |
| EP | 0836054 | 4/1998 | | |
| EP | 1215441 A2 * | 6/2002 | ............. | F23N 5/102 |
| EP | 3086038 | 10/2016 | | |
| FR | 2523693 | 9/1983 | | |
| JP | H04302913 A * | 10/1992 | ............... | F23N 5/20 |
| JP | 2014-16061 A | 1/2014 | | |
| KR | 10-2006-0049168 A | 5/2006 | | |
| KR | 10-2009-0090428 A | 8/2009 | | |
| WO | WO-2009040115 A2 * | 4/2009 | ............. | F23N 1/002 |
| WO | WO-2009040243 A2 * | 4/2009 | ............. | F24C 3/126 |

OTHER PUBLICATIONS

Extended European Search Report dated Mar. 19, 2021 from European Application No. 18914952.9, 8 pages.
International Search Report dated Jan. 17, 2019, in corresponding International Patent Application No. PCT/KR2018/010726.
Office Action dated Jun. 9, 2022 issued in Chinese Application No. 201880092477.3.
Office Action dated Aug. 11, 2022 issued in Korean Application No. 10-2018-0045086.

* cited by examiner

COOKING APPARATUS AND CONTROL METHOD THEREOF

CROSS-REFERENCE TO RELATED APPLICATIONS

This application is a U.S. National Stage Application which claims the benefit under 35 U.S.C. § 371 of International Patent Application No. PCT/KR2018/010726 filed on Sep. 13, 2018, which claims foreign priority benefit under 35 U.S.C. § 119 of Korean Patent Application 10-2018-0045086 filed on Apr. 18, 2018, in the Korean Intellectual Property Office, the contents of both of which are incorporated herein by reference.

TECHNICAL FIELD

The present disclosure relates to a cooking apparatus and a control method thereof, and more particularly, to a cooking apparatus having a boosting function and a control method thereof.

BACKGROUND ART

In general, a cooking apparatus is a device that cooks by heating food, and is largely classified into a method of generating heat for heating food using electricity and a method of generating heat for heating food using gas.

Such cooking apparatus includes a gas range, an oven, an electric range, and the like.

A gas range needs to shorten the cooking time by applying heat of a relatively high temperature to the beginning of cooking and applying a relatively appropriate amount of heat to the middle and/or end of cooking.

A conventional gas range needs to include a separate structure in order to shorten the cooking time by providing a relatively large amount of heat at the beginning of cooking.

In addition, in a conventional gas range, when the amount of gas supplied during a cooking process changes rapidly, or when a relatively small amount of heat is provided, a fire may goes out as ambient air flows into a heating device to which gas is supplied.

DISCLOSURE

Technical Problem

The present disclosure is directed to providing a cooking apparatus capable of controlling a boosting mode with a relatively simple configuration, and a control method thereof.

Further, the present disclosure is directed to providing a cooking apparatus capable of preventing a risk due to a fire when the amount of gas changes rapidly configuration, and a control method thereof.

Further, the present disclosure is directed to providing a cooking apparatus capable of preventing a fire from being turned off when a relatively small amount of heat is provided to a heating device, and a control method thereof.

Technical Solution

One aspect of the present disclosure provides a cooking apparatus including a heating device, a gas passage to guide gas supplied from the outside to the heating device, a gas valve configured to supply gas to the gas passage, a modulating valve configured to adjust the degree of opening of the gas passage, a boosting passage formed to be branched from a first portion of the gas passage and joined to a second portion of the gas passage positioned in the rear of the first portion along a direction in which gas in the gas passage flows, a boosting valve configured to open and close the boosting passage, a first nozzle disposed between the first portion and the second portion of the gas passage, and a second nozzle disposed between the second portion of the gas passage and the heating device.

The cooking apparatus may further include a knob connected to the gas valve to interlock with opening and closing operations of the gas valve, and a sensor configured to detect a position of the knob.

The cooking apparatus may further include a frame on which the modulating valve and the boosting valve are mounted.

The first nozzle may be mounted on the frame.

A size of an opening of the second nozzle may be larger than a size of an opening of the first nozzle.

The cooking apparatus may further include a controller configured to control opening and closing operations of the modulating valve and control opening and closing operations of the boosting valve.

The cooking apparatus may further include a knob connected to the gas valve to interlock with opening and closing operations of the gas valve, a sensor configured to detect a position of the knob, and an ignition device configured to ignite the heating device, wherein when the knob is positioned at a preset first point, the controller may operate the ignition device, open the modulating valve, and close the boosting valve.

When the knob is positioned at a preset second point, the controller may operate a boosting mode to open the boosting valve and the modulating valve.

When the knob is positioned at a preset second point, the controller may open the modulating valve and intermittently open the boosting valve.

When the knob is positioned at a preset second point, the controller may open the modulating valve and intermittently open the boosting valve, and when a preset boosting time elapses, the controller may close the boosting valve.

When the knob is positioned at a preset third point, the controller may open the modulating valve and close the boosting valve.

When the knob is positioned at a preset third point, the controller may close the boosting valve and intermittently open the modulating valve.

When the knob deviates from the first point and the second point, the controller may close the boosting valve and control an opening time of the modulating valve according to the position of the knob.

When the knob returns to the first point again in a state of deviating from the first point, the controller may determine whether a preset ignition time has elapsed after the ignition device is operated, and may determine whether to re-operate the ignition device based on whether the preset ignition time has elapsed.

When the knob returns to the second point again in a state of deviating from the second point, the controller may determine whether a preset boosting delay time has elapsed after the boosting mode is operated, and may determine whether to re-operate the boosting mode based on whether the preset boosting delay time has elapsed.

Another aspect of the present disclosure provides a method of controlling a cooking apparatus which includes a heating device, a knob connected to the gas valve to interlock with opening and closing operations of the gas valve, a sensor configured to detect a position of the knob, and an ignition device configured to ignite the heating device, including detecting a position of the knob, and operating the ignition device when the knob is positioned at a preset first point, opening a modulating valve configured to adjust the degree of opening of a gas passage, and closing a boosting valve configured to open and close a boosting passage formed to be branched from a first portion of the gas passage and joined to a second portion of the gas passage positioned in the rear of the first portion along a direction in which gas in the gas passage flows.

The method may further include operating a boosting mode to open the boosting valve and the modulating valve when the knob is positioned at a preset second point.

The method may further include opening the modulating valve and intermittently opening the boosting valve when the knob is positioned at a preset second point.

The method may further include opening the modulating valve and intermittently opening the boosting valve when the knob is positioned at a preset second point, and closing the boosting valve when a preset boosting time elapses. The method may further include opening the modulating valve and closing the boosting valve when the knob is positioned at a preset third point.

The method may further include closing the boosting valve and controlling an opening time of the modulating valve according to the position of the knob when the knob deviates from the first point and the second point.

Advantageous Effects

A cooking apparatus according to an embodiment of the present disclosure can control a boosting mode only by rotating a knob, so that convenience of use can be improved.

Further, the cooking apparatus according to an embodiment of the present disclosure includes a control valve capable of adjusting the degree of opening of a gas passage, so that a risk due to fire can be prevented even when the amount of gas changes rapidly, and a fire can be prevented from going out even when a relatively small amount of heat is provided.

MODE OF THE DISCLOSURE

Figure 1:
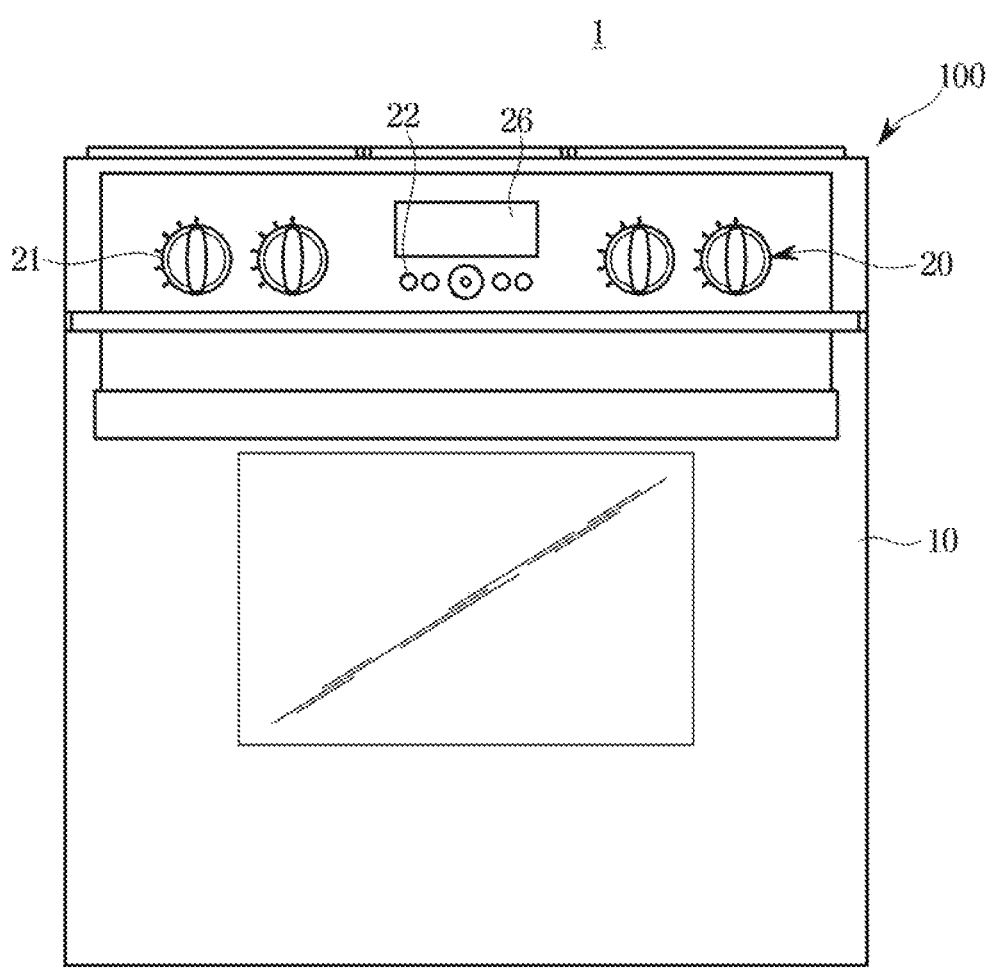
FIG. 1 illustrates a cooking apparatus according to an embodiment of the present disclosure.

The embodiments described in the present specification and the configurations shown in the drawings are only examples of preferred embodiments of the present disclosure, and various modifications may be made at the time of filing of the present disclosure to replace the embodiments and drawings of the present specification.

Like reference numbers or signs in the various drawings of the application represent parts or components that perform substantially the same functions.

The terms used herein are for the purpose of describing the embodiments and are not intended to restrict and/or to limit the present disclosure. For example, the singular expressions herein may include plural expressions, unless the context clearly dictates otherwise. Also, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that, although the terms first, second, etc. may be used herein to describe various components, these components should not be limited by these terms. These terms are only used to distinguish one component from another. For example, without departing from the scope of the present disclosure, the first component may be referred to as a second component, and similarly, the second component may also be referred to as a first component. The term "and/or" includes any combination of a plurality of related items or any one of a plurality of related items.

In this specification, the terms "front end," "rear end," "upper portion," "lower portion," "upper end" and "lower end" used in the following description are defined with reference to the drawings, and the shape and position of each component are not limited by these terms.

Reference numerals used in operations are provided for convenience of description, without describing the order of the operations, and the operations may be executed in a different order from the stated order unless a specific order is definitely specified in the context.

Hereinafter, embodiments of the present disclosure will be described in detail with reference to the accompanying drawings.

Figure 2:
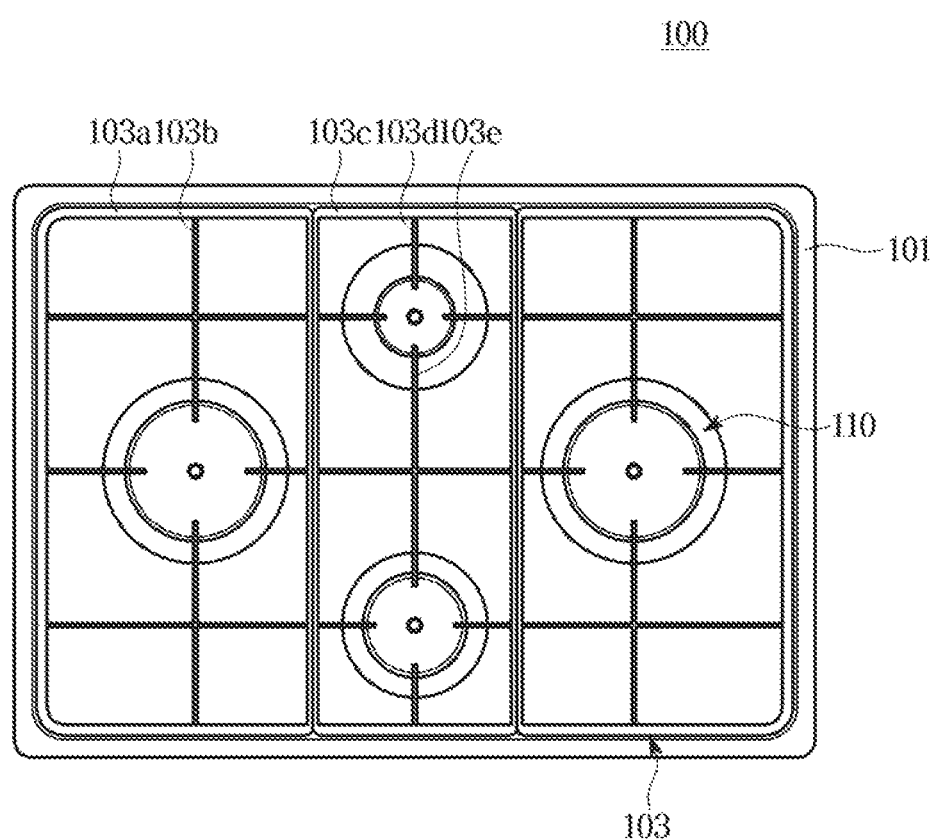
FIG. 2 illustrates a top surface of a cooking device provided in the cooking apparatus illustrated in FIG. 1.

FIG. 1 illustrates a cooking apparatus according to an embodiment of the present disclosure. FIG. 2 illustrates a top surface of a cooking device provided in the cooking apparatus illustrated in FIG. 1.

Referring to FIG. 1, a cooking apparatus 1 according to an embodiment of the present disclosure may include a main body 10 forming an outer appearance thereof. A cooking device 100 may be provided on an upper portion of the main body 10. The cooking device 100 is provided such that a cooking container may be placed thereon, and may be configured to supply heat to the cooking container to cook food in the cooking container. The cooking device 100 may be a gas range that supplies heat using gas.

Although not shown, a cooking space provided to be sealed by a door may be formed in a lower portion of the main body 10, and a cooking device configured to apply heat to the cooking space to cook food by dry heat may be additionally provided. The cooking device provided in the lower portion of the main body 10 may be an oven.

The cooking apparatus 1 may include a user interface 20 disposed on the main body 10. The user interface 20 may input and/or output cooking information of the cooking apparatus 1. The user interface 20 may include inputs 21 and 22 to input cooking information and a display 26 to display cooking information.

The inputs 21 and 22 may include the first input 21 provided in a knob dial type and the second input 22 provided in a button type. Hereinafter, the first input 21 provided in a knob dial type is referred to as the knob 21.

The display 26 may display information input to the inputs 21 and 22. The display 26 may display cooking information of the cooking apparatus 1. The display 26 may be provided as a touch screen. In this case, a user may input a command for controlling the cooking apparatus 1 through the display 26.

Referring to FIG. 2, the cooking device 100 may include an upper plate 101 covering an upper side of the main body 10, a container supporter 103 detachably provided on an upper side of the upper plate 101 to support a cooking container, and a range assembly 110 disposed on the upper plate 101 and configured to generate heat.

A plurality of the range assemblies 110 may be provided, and the plurality of range assemblies 110 may be the same or different from each other in maximum output level.

The container supporter 103 forms a pair with one of the range assembly 110 and may be positioned around the paired range assembly 110 to support a cooking container located in the paired range assembly 110.

The container supporter 103 may include a frame 103a in contact with the upper plate 101, and at least three support legs 103b protruding from the frame 103a to support a cooking container.

The at least three support legs 103b may allow a cooking container to be placed at a predetermined distance from the range assembly 110.

The container supporter 103 may include a frame 103c having a size to accommodate at least two of the range assemblies 110, and a plurality of support legs 103d each protruding from the frame 103c toward the at least two of the range assemblies.

The plurality of support legs 103d may include a common support leg 103e in which at least two of the support legs facing the range assemblies 110 different from each other are connected to each other.

As described above, when the plurality of range assemblies 110 is provided, the container supporters 103 may be provided in a single form for each of the range assemblies 110, may be provided in a form of being connected to each other as a whole, and may be provided in a form of being connected to each other in only a portion. The shape and size of outer sides of the frames 103a and 103c of the container supporter 103 correspond to the shape and size of an outer side of the upper plate 101, respectively. Accordingly, the container supporter 103 may be fixedly disposed on the upper plate 101.

Figure 3:
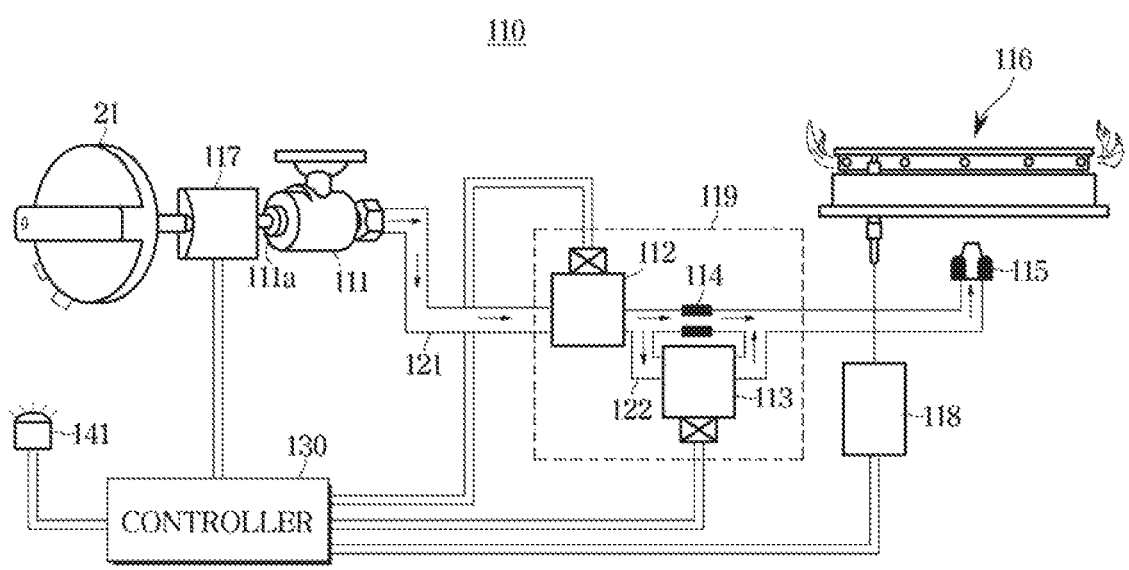
FIG. 3 schematically illustrates a configuration of a range assembly illustrated in FIG. 2.

FIG. 3 schematically illustrates a configuration of a range assembly illustrated in FIG. 2.

Hereinafter, the configuration of the range assembly 110 will be described with reference to FIG. 3. Although the plurality of range assemblies 110 may be provided as described above, for convenience of description, only one of the range assembly 110 will be described as an example.

Referring to FIG. 3, the range assembly 110 may include a gas valve 111 to receive gas from the outside. The gas valve 111 may guide gas supplied from an external gas supply source (not shown) to the gas passage 121. The gas valve 111 may open and close a flow passage through which gas supplied from the external gas supply source moves to the gas passage 121. The gas valve 111 may adjust the degree of opening of a gas supply passage as the knob 21 rotates. For example, when the knob 21 is rotated by 90 degrees, the gas valve 111 may open the gas supply passage to a maximum size, and when the knob 21 is further rotated up to 270 degrees, the gas valve 111 may reduce the size of the gas supply passage to open the gas supply passage to the minimum size. The gas valve 111 may be one of a manual valve, a solenoid valve, and a modulating valve.

The range assembly 110 may include a modulating valve 112 to open and close the gas passage 121. The modulating valve 112 may be disposed on the gas passage 121. The modulating valve 112 may be connected to a controller 130 to be controlled by the controller 130. The modulating valve 112 may be a solenoid valve.

The range assembly 110 may include a boosting valve 113 disposed on a boosting passage 122 branched from the gas passage 121. The boosting valve 113 may be provided to open and close the boosting passage 122. The boosting valve 113 may be connected to the controller 130 to be controlled by the controller 130. The boosting valve 113 may be a solenoid valve.

The modulating valve 112 and the boosting valve 113 may be disposed in parallel on a single frame 119. Although not shown, the modulating valve 112 and the boosting valve 113 may be disposed in series on a single frame. Also, the modulating valve 112 and the boosting valve 113 are not disposed on a single frame and may be disposed separately.

The range assembly 110 may include a first nozzle 114. The first nozzle 114 may limit an amount by which gas passed through the modulating valve 112 is supplied to a heating device 116 when the range assembly 110 is operated in a normal mode. Specifically, the first nozzle 114 may limit the amount of gas supplied to the heating device 116 when the range assembly 110 is operated in the normal mode. The first nozzle 114 may be disposed at the rear of the modulating valve 112 (that is, to the right of the modulating valve 112 in FIG. 3) along a direction in which gas in the gas passage 121 flows (that is, from left to right in FIG. 3).

The range assembly 110 may include a second nozzle 115. The second nozzle 115 may limit an amount by which gas passed through the boosting valve 113 is supplied to the heating device 116 when the range assembly 110 is operated in a boosting mode. Specifically, the second nozzle 115 may limit the amount by which gas passed through the boosting valve 113 and the first nozzle 114 is supplied to the heating device 116.

The heating device 116 may be configured to apply heat to a cooking container as gas is supplied through the gas passage 121 and ignited by an ignition device 118.

The range assembly 110 may include a sensor 117. The sensor 117 may be mounted on a shaft 111a of the gas valve 111. The sensor 117 may be disposed adjacent to the gas valve 111. The sensor 117 may detect a rotation position of the knob 21 and transmit information on the rotation position of the knob 21 to the controller 130. For example, when the knob 21 is positioned at a boosting mode point, the sensor 117 may detect and transmit this position to the controller 130, and the controller 130 may open the boosting valve 113 so that the range assembly 110 may be operated in the boosting mode. At this time, the controller 130 may also open the modulating valve 112.

On the other hand, the sensor 117 may be configured not to transmit separate information to the controller 130 when the knob 21 deviates from the boosting mode point. Accordingly, the controller 130 may close the boosting valve 113 so that the range assembly 110 operates in the normal mode. In this case, the controller 130 may open the modulating valve 112. With the above configuration, the range assembly 110 according to an embodiment of the present disclosure may easily operate the boosting mode with a relatively simple configuration by the sensor 117.

The ignition device 118 may be provided such that the heating device 116 is ignited when gas is supplied to the heating device 116. The ignition device 118 may be connected to the controller 130 to be controlled by the controller 130.

The gas passage 121 may be configured to guide gas supplied through the gas valve 111 to the heating device 116. The modulating valve 112 and the first nozzle 114 may be disposed on the gas passage 121. The second nozzle 115 may be disposed at one end of the gas passage 121 close to the heating device 116.

The boosting passage 122 may be provided to be branched and extend from one portion of the gas passage 121 and to be joined to the other portion of the gas passage 121. In this case, the one portion of the gas passage 121 to which the boosting passage 122 is branched may be disposed in front of the other portion of the gas passage 121 where the boosting passage 122 is joined to the gas passage 121, based on a direction in which the gas flows (that is, on the left based on FIG. 3). The boosting valve 113 may be disposed on the boosting passage 122.

The controller 130 may control the operation of the range assembly 110. The controller 130 may receive position information of the knob 21 from the sensor 117. The controller 130 may be connected to the modulating valve 112 to control the opening and closing operation of the modulating valve 112. The controller 130 may be connected to the boosting valve 113 to control the opening and closing operation of the boosting valve 113. The controller 130 may be connected to the ignition device 118 to control the ignition device 118 to ignite the heating device 116 when the knob is positioned at an ignition point. The controller 130 may be connected to a notification device 141 to turn on the notification device 141 when the range assembly 110 is operated in the boosting mode.

The controller 130 may be implemented as a memory (not shown) for storing an algorithm for controlling the operation of components in the range assembly 110 or a data for a program reproducing the algorithm and a processor (not shown) for performing the above-described operations using data stored in the memory. In this case, the memory may be implemented as a separate chip from the processor, and may be implemented as a single chip with the processor.

The range assembly 110 may include the notification device 141 to allow a user to recognize the boosting mode by being lit when the knob 21 is positioned at the boosting mode point.

Although not shown, the range assembly 110 may further include an ignition detection means capable of detecting whether the heating device 116 is ignited, and the ignition detection means may include an ignition sensor or an ignition detection electrode. The detection result may be provided to the controller 130.

At least one component may be added or removed according to the performance of the components of the range assembly 110 illustrated in FIG. 3. It will be readily understood by those of ordinary skill in the art that the mutual positions of the components may be changed corresponding to the performance or structure of a system.

Some components illustrated in FIG. 3 may be software and/or hardware components such as Field Programmable Gate Array (FPGA) and Application Specific Integrated Circuit (ASIC).

Hereinafter, a process in which the controller 130 controls each component of the range assembly 110 will be described in detail with reference to FIG. 4.

Figure 4:
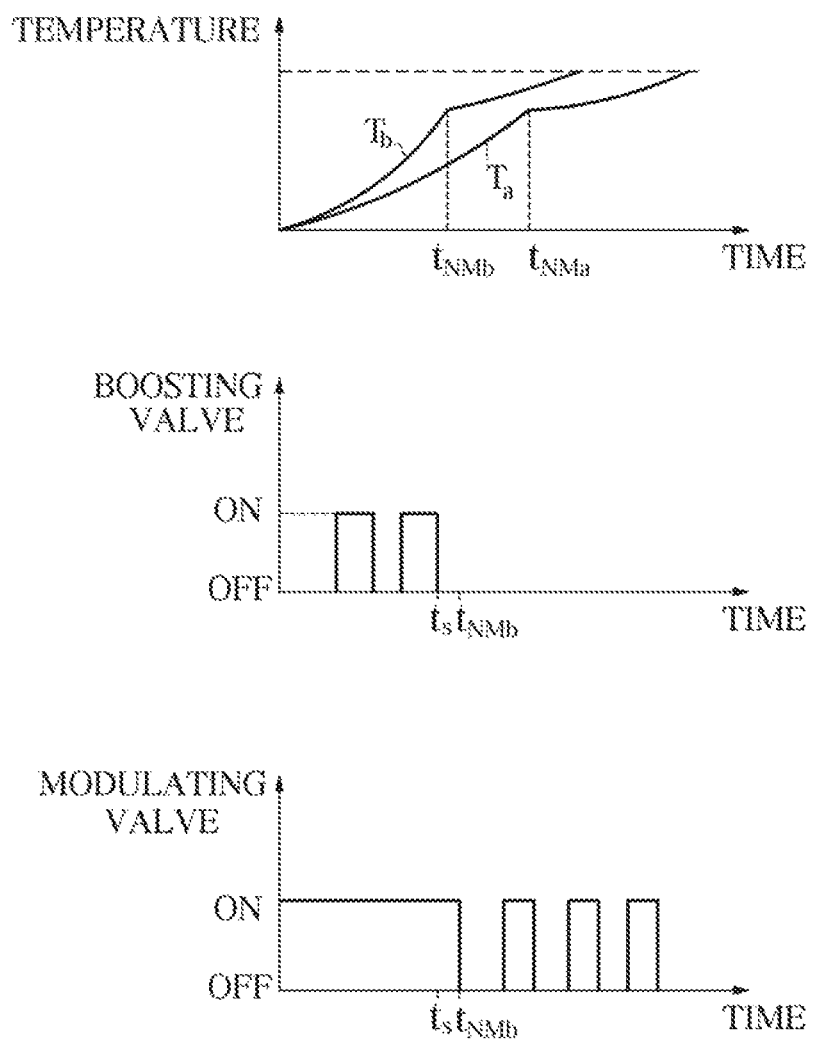
FIG. 4 illustrates for explaining a temperature of a cooking container that changes by an operation of the range assembly and a method of operating each valve of the range assembly.

FIG. 4 illustrates for explaining a temperature of a cooking container that changes by the operation of the range assembly described above and a method of operating each valve of the range assembly.

The controller 130 closes the modulating valve 112 and the boosting valve 113 so that gas is not supplied to the heating device 116 when the knob is positioned at a first point (initial point, for example, the point of 0 degrees).

When the user positions the knob at a second point (ignition point, for example, the point of 45 degrees), the controller 130 opens the modulating valve 112 and turns on the ignition device 118 to ignite the heating device 116.

Referring to Ta in FIG. 4A, when a temperature of a cooking container reaches a certain level, the conventional cooking apparatus 1 reduces the rate of increase in the temperature of the cooking container at a time point $t_{NMa}$ to prevent fire, and in the case of the conventional cooking apparatus 1, gas supplied to the ignition device 118 may be controlled only by only one valve, so that it takes a long time ($t_{NMa}$) to increase the temperature of gas to the certain level.

However, referring to Tb in FIG. 4A, in the case of the cooking apparatus 1 according to an embodiment, the boosting valve 113 and the modulating valve 112 are provided in the cooking apparatus 1, so that it takes a time (Ma) shorter than before to increase the temperature of gas to the certain level.

Specifically, the controller 130 of the cooking apparatus 1 according to an embodiment operates the boosting mode when the knob is positioned at a third point (boosting point, for example, the point of 90 degrees), and opens both the boosting valve 113 and the modulating valve 112 in the boosting mode.

When the boosting valve 113 is opened in the boosting mode, the gas supply is not limited by the first nozzle 114 in the boosting passage 122, so that a large amount of gas may be quickly supplied to the heating device 116.

The controller 130 terminates the boosting mode and operates the normal mode when a preset boosting time elapses or the knob position deviates from the third point (for example, when the knob position is over 90 degrees and less than 270 degrees). The controller 130 opens the modulating valve 112 and closes the boosting valve 113 in the normal mode. The normal mode may include a normal max mode of continuously closing the boosting valve 113 and continuously opening the modulating valve 112 when the boosting time elapses, and a normal simmer mode of continuously closing the boosting valve 113 and intermittently opening and closing the modulating valve 112 when the knob position deviates from the third point.

As illustrated in FIG. 4B, in the boosting mode, the controller 130 may not only continuously open the boosting valve 113, but also intermittently repeatedly control the opening and closing of the boosting valve 113. Also, the controller may continuously open the modulating valve 112 in the boosting mode.

When a preset boosting time $t_N$ elapses, the controller 130 may operate the normal max mode, close the boosting valve 113, and continuously open the modulating valve 112.

As such, the supply rate of gas supplied to the heating device 116 may be adjusted by the intermittent control of the boosting valve 113 in the boosting mode, and thus the rate of temperature increase of the cooking container may also be adjusted.

As illustrated in FIG. 4C, when the knob is deviated from the boosting mode point at a time point $t_{NMb}$ according to the user's manipulation, the controller 130 may operate the normal simmer mode.

In the normal simmer mode, the controller 130 may not only continuously open the modulating valve 112, but also intermittently repeatedly control the opening and closing of the modulating valve 112. However, as in normal max mode, the controller continuously closes the boosting valve 113 in the normal simmer mode.

In the normal simmer mode, the controller 130 may adjust the opening duration and the closing duration of the modulating valve 112 according to the position of the knob. For example, the controller 130 may repeatedly perform the operation of opening the modulating valve 112 for 10 seconds and closing for 50 seconds when the knob is positioned at a fourth point (for example, at the point of 120 degrees), and may repeatedly perform the operation of opening the modulating valve 112 for 20 seconds and closing for 40 seconds when the knob is positioned at a fifth point (for example, at the point of 150 degrees).

In the normal simmer mode, the controller 130 may gradually increase the opening duration of the modulating valve 112 when the knob is positioned at a preset automatic adjustment point (for example, more than the point of 210 degrees and less than the point of 360 degrees).

For example, when the knob is positioned at the automatic adjustment point, the controller 130 may perform the operations of opening the modulating valve 112 for 10 seconds and closing for 50 seconds and then opening for 20 seconds and closing for 40 seconds, and then opening for 30 seconds and closing for 30 seconds, and then opening for 40 seconds and closing for 20 seconds, and then repeatedly opening for 50 seconds and closing for 10 seconds.

Even when the knob is positioned at a point for supplying the maximum amount of gas, the amount of gas supplied to the heating device 116 gradually increases, so that an accident due to a sudden increase in the amount of gas may be prevented.

When the user positions the knob back to the first point, both the modulating valve 112 and the boosting valve 113 are closed, so that gas is not supplied to the heating device 116.

However, when the user attempts to operate the boosting mode again in the normal simmer mode, the knob may return to the third point from a point deviating from the third point, and the controller 130 may operate the boosting mode again.

On the other hand, the controller 130 of the cooking apparatus 1 according to another embodiment determines whether a preset boosting delay time (for example, 5 minutes) has elapsed after the boosting mode is operated in order to reduce a risk due to excessive continuation of the boosting mode, and may operate the boosting mode again only when the boosting delay time elapses and the knob is positioned at the second position.

When the user attempts to ignite the heating device 116 again, the knob may return to the first point from a point deviating from the first point, and the controller 130 may operate the ignition device 118 again.

The controller 130 of the cooking apparatus 1 according to another embodiment determines whether a preset ignition time (for example, 1 minute) has elapsed after the ignition device 118 is operated in order to reduce a risk due to excessive operation of the ignition device 118, and may operate the ignition device 118 again only when the knob is positioned at the first point after the ignition time elapses.

Figure 5:
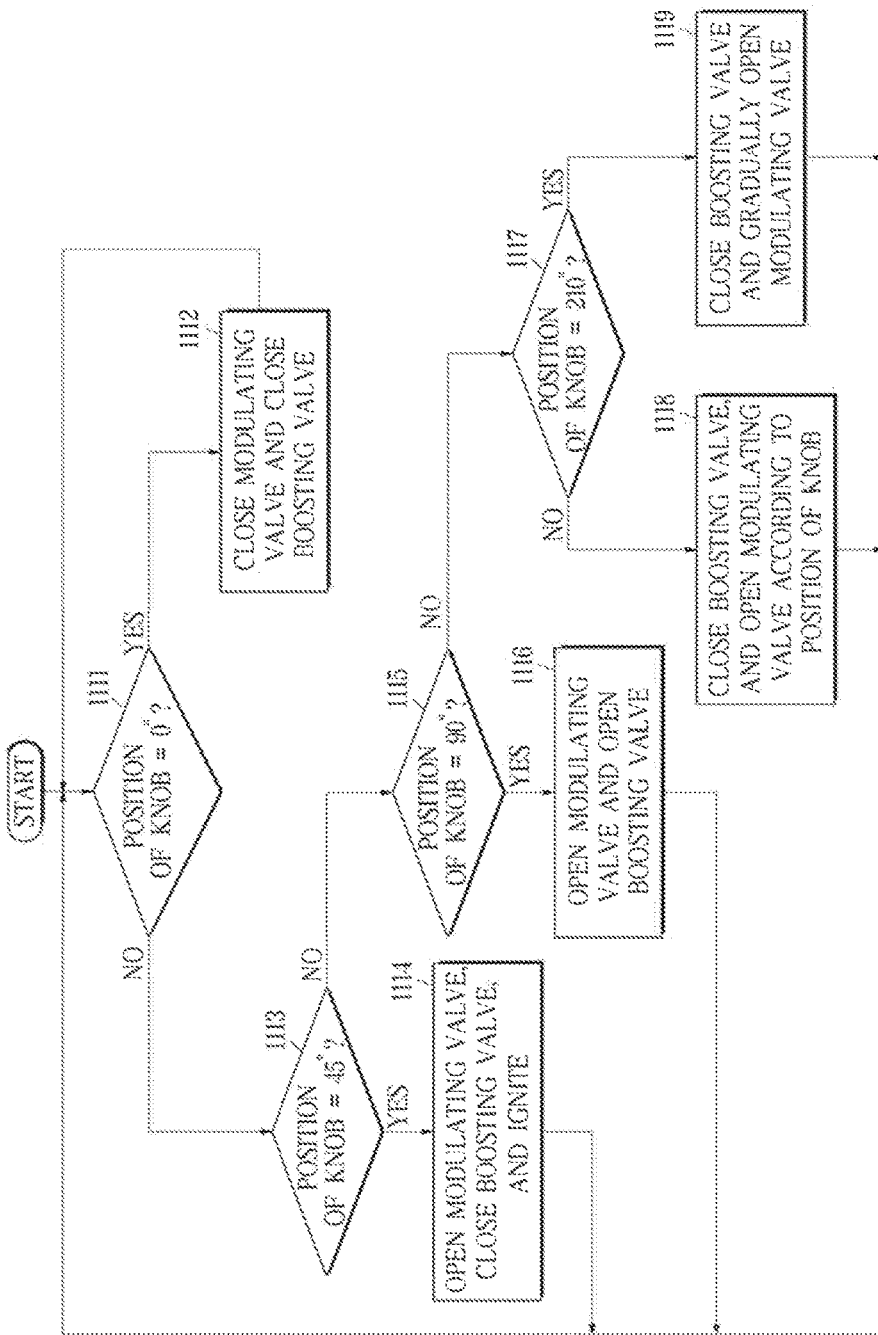
FIG. 5 is a flowchart of a method of controlling the cooking apparatus according to an embodiment of the present disclosure.

Hereinafter, a method of controlling the cooking apparatus 1 according to an embodiment will be described with reference to FIG. 5. FIG. 5 is a flowchart of a method of controlling the cooking apparatus according to an embodiment of the present disclosure.

Hereinafter, for convenience of explanation, it will be described for example that the first point is a point where a rotation angle of the knob that is physically rotated is 0 degrees, the second point is a point where the rotation angle of the knob is 45 degrees, the third point is a point where the rotation angle of the knob is 90 degrees, the fourth and fifth points are points where the rotation angle of the knob exceeds 90 degrees and is 210 degrees or less, respectively, and a sixth point is a point where the rotation angle of the knob exceeds 210 degrees, but each point may be positioned at a different point.

First, the cooking apparatus 1 according to an embodiment closes both the modulating valve 112 and the boosting valve 113 when the knob is positioned at 0 degrees ("YES" in 1111) (1112). Thereafter, when the knob is positioned at the point of 45 degrees ("YES" in 1113), the cooking apparatus 1 opens the modulating valve 112 and closes the boosting valve 113 to ignite the heating device 116 by operating the ignition device 118 while suppling gas to the heating device 116 (1114).

Then, when the knob is positioned at the 90 degree point ("YES" in 1115), the cooking apparatus 1 operates the boosting mode and opens the modulating valve 112 and the boosting valve 113 (1116). In this case, the cooking apparatus 1 may intermittently open the boosting valve 113 and adjust the opening duration, thereby controlling the rate of temperature increase.

The cooking apparatus 1 may operate the boosting mode only for the preset boosting time. In this case, the cooking apparatus 1 may automatically operate the normal max mode when the boosting time elapses, and may open the modulating valve 112, but close the boosting valve 113.

Then, the cooking apparatus 1 may operate the normal simmer mode when the knob deviates from the point of 90 degrees ("NO" in 1115), and may intermittently open the modulating valve 112 according to the position of the knob in a state of closing the boosting valve 113 when the knob is positioned at a point of 210 degrees or less ("NO" in 1117) (1118).

For example, in the normal simmer mode, as the rotation angle of the knob gradually increases, the cooking apparatus 1 may increase the opening time of the modulating valve 112 per any one period and decrease the closing time. On the contrary, as the rotation angle of the knob gradually increases, the cooking apparatus 1 may decrease the opening time of the modulating valve 112 per any one period and increase the closing time.

When the knob is positioned at any point exceeding the point of 210 degrees ("YES" in 1117), the cooking apparatus 1 determines that the knob is positioned at the automatic adjustment point, and may gradually increase the opening time of the modulating valve 112 per any one period in a state of closing the boosting valve 113.

For example, when it is determined that the knob is located at the automatic adjustment point, the cooking apparatus 1 may perform the operations of opening the modulating valve 112 for 10 seconds and closing for 50 seconds and then opening for 20 seconds and closing for 40 seconds, and then opening for 30 seconds and closing for 30 seconds, and then opening for 40 seconds and closing for 20 seconds, and then repeatedly opening for 50 seconds and closing for 10 seconds.

When the knob is again positioned at the point of 0 degrees, both the modulating valve 112 and the boosting valve 113 are closed, and thus gas is not supplied to the heating device 116.

Herein, the disclosed embodiments may be implemented in the form of a recording medium storing instructions executable by a computer. The instructions may be stored in the form of program code, and when executed by a processor, a program module may be created to perform the operations of the disclosed embodiments. The recording medium may be implemented as a computer-readable recording medium.

The computer-readable recording medium includes various kinds of recording media in which instructions which may be decrypted by a computer are stored. For example, there may be a ROM (Read Only Memory), a RAM (Random Access Memory), a magnetic tape, a magnetic disk, a flash memory, an optical data storage device, and the like.

While the present disclosure has been particularly described with reference to exemplary embodiments, it should be understood by those of skilled in the art that various changes in form and details may be made without departing from the spirit and scope of the present disclosure.

The invention claimed is:

1. A cooking apparatus comprising:
a heating device;
a gas passage to guide gas supplied from an external gas supply source to the heating device;
a gas valve configured to open or close to control supply of the gas to the gas passage;
a modulating valve configured to adjust a degree of opening of the gas passage;
a boosting passage formed to be branched from a first portion of the gas passage and joined to a second portion of the gas passage which is positioned in a rear of the first portion along a direction in which the gas in the gas passage flows;
a boosting valve configured to open or close the boosting passage;
a first nozzle between the first portion the gas passage and the second portion of the gas passage to control an amount of the gas pass through the gas passage;
a second nozzle between the second portion of the gas passage and the heating device to discharge the gas to the heating device therethrough;
a controller configured to control opening and closing operations of the modulating valve and control opening and closing operations of the boosting valve;
a knob connected to the gas valve to interlock with the opening and the closing operations of the gas valve;
a sensor configured to detect a position of the knob; and
an ignition device configured to ignite the gas discharged from the second nozzle,
wherein in response to the knob being positioned at a preset first point, the controller is configured to control the modulating valve to open, the boosting valve to close, and the ignition device to operate, and in response to the knob being positioned at a preset third point, the controller closes the boosting valve and intermittently opens the modulating valve.

2. The cooking apparatus according to claim 1, wherein in response to the knob being positioned at a preset second point, the controller operates a boosting mode to open the boosting valve and the modulating valve.

3. The cooking apparatus according to claim 1, wherein in response to the knob being positioned at a preset second point, the controller opens the modulating valve and intermittently opens the boosting valve.

4. The cooking apparatus according to claim 1, wherein in response to the knob being positioned at a preset second point, the controller opens the modulating valve and intermittently opens the boosting valve, and when a preset boosting time elapses, the controller closes the boosting valve.

5. The cooking apparatus according to claim 1, wherein in response to the knob being positioned at the preset third point, the controller opens the modulating valve and closes the boosting valve.

6. The cooking apparatus according to claim 2, wherein in response to the knob being deviated from the first point and the second point, the controller closes the boosting valve and controls an opening time of the modulating valve according to the position of the knob.

7. The cooking apparatus according to claim 1, wherein in response to the knob being returned to the first point again in a state of deviating from the first point, the controller determines whether a preset ignition time has elapsed after the ignition device is operated, and determines whether to re-operate the ignition device based on whether the preset ignition time has elapsed.

8. The cooking apparatus according to claim 2, wherein in response to the knob being returned to the second point again in a state of deviating from the second point, the controller determines whether a preset boosting delay time has elapsed after the boosting mode is operated, and determines whether to re-operate the boosting mode based on whether the preset boosting delay time has elapsed.

9. A method of controlling a cooking apparatus which comprises a heating device, a knob connected to the gas valve to interlock with opening and closing operations of the gas valve, a sensor configured to detect a position of the knob, and an ignition device configured to ignite the heating device, comprising:
detecting a position of the knob; and
operating the ignition device in response to the knob being positioned at a preset first point, opening a modulating valve configured to adjust the degree of opening of a gas passage, and closing a boosting valve configured to open and close a boosting passage formed to be branched from a first portion of the gas passage and joined to a second portion of the gas passage positioned in the rear of the first portion along a direction in which gas in the gas passage flows; and
in response to the knob being positioned at a preset third point, opening the modulating valve and closing the boosting valve.

10. The method according to claim 9, further comprising operating a boosting mode to open the boosting valve and the modulating valve in response to the knob being positioned at a preset second point.

11. The method according to claim 9, further comprising opening the modulating valve and intermittently opening the boosting valve in response to the knob being positioned at a preset second point.

12. The method according to claim 9, further comprising opening the modulating valve and intermittently opening the boosting valve in response to the knob being positioned at a preset second point, and closing the boosting valve in response to elapsing of a preset boosting time.

13. The method according to claim 10, further comprising closing the boosting valve and controlling an opening time of the modulating valve according to the position of the knob in response to the knob being deviated from the first point and the second point.

\* \* \* \* \*